US010746364B2

(12) United States Patent
Hessling-Von Heimendahl et al.

(10) Patent No.: US 10,746,364 B2
(45) Date of Patent: Aug. 18, 2020

(54) GROUND ILLUMINATION AIRCRAFT LIGHT UNIT

(71) Applicant: Goodrich Lighting Systems GmbH, Lippstadt (DE)

(72) Inventors: Andre Hessling-Von Heimendahl, Koblenz (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 102 days.

(21) Appl. No.: 15/887,007

(22) Filed: Feb. 2, 2018

(65) Prior Publication Data

US 2018/0231204 A1  Aug. 16, 2018

(30) Foreign Application Priority Data

Feb. 10, 2017  (EP) .................... 17155659.0

(51) Int. Cl.
| | |
|---|---|
| *F21S 41/135* | (2018.01) |
| *B64D 47/04* | (2006.01) |
| *F21S 41/147* | (2018.01) |
| *F21S 41/20* | (2018.01) |
| *G02B 27/28* | (2006.01) |

(52) U.S. Cl.
CPC ............ *F21S 41/135* (2018.01); *B64D 47/04* (2013.01); *F21S 41/147* (2018.01); *F21S 41/285* (2018.01); *G02B 27/281* (2013.01)

(58) Field of Classification Search
None
See application file for complete search history.

(56) References Cited

U.S. PATENT DOCUMENTS

| | | | |
|---|---|---|---|
| 3,754,135 A | 8/1973 | Hulbert, Jr. | |
| 4,020,336 A | 4/1977 | Linder | |
| 4,219,867 A * | 8/1980 | Zehender | G02B 27/283 |
| | | | 362/518 |
| 5,860,735 A | 1/1999 | Keech | |
| 7,134,771 B2 | 11/2006 | Stout et al. | |

(Continued)

FOREIGN PATENT DOCUMENTS

| | | |
|---|---|---|
| EP | 1168902 A2 | 1/2002 |
| GB | 2362206 A1 | 11/2001 |

(Continued)

OTHER PUBLICATIONS

Extended European Search Report for International Application No. 17155659.0 dated May 24, 2017, 7 pages.

*Primary Examiner* — Derek S. Chapel
(74) *Attorney, Agent, or Firm* — Cantor Colburn LLP

(57) ABSTRACT

A ground illumination aircraft light unit includes a mounting portion, which is configured for mounting the light unit to an aircraft; a transparent cover, which is mounted to the mounting portion and in combination with the mounting portion defines an interior space of the light unit; and at least one light source, which is arranged within the interior space of the light unit and which is configured for emitting light for illuminating an airfield in the vicinity of the aircraft. The light unit is configured to emit predominantly p-polarized light in a predefined spatial sector; and to emit non-polarized light in an area outside said predefined spatial sector.

18 Claims, 5 Drawing Sheets

(56) References Cited

U.S. PATENT DOCUMENTS

| | | | |
|---|---|---|---|
| 7,806,538 B2 * | 10/2010 | Ajiki | F21S 41/135 |
| | | | 362/19 |
| 8,523,417 B2 | 9/2013 | Kobayashi | |
| 8,579,480 B2 * | 11/2013 | Willeke | B64D 47/04 |
| | | | 362/470 |
| 2003/0103261 A1 | 6/2003 | Hay | |
| 2006/0215076 A1 | 9/2006 | Karim | |
| 2007/0002572 A1 * | 1/2007 | Ewig | B64D 47/06 |
| | | | 362/470 |
| 2009/0109648 A1 | 4/2009 | Hay | |
| 2009/0279278 A1 | 11/2009 | Tsujimura et al. | |
| 2013/0155645 A1 | 6/2013 | Marius | |
| 2014/0239808 A1 | 8/2014 | Nava et al. | |
| 2015/0274320 A1 * | 10/2015 | Jha | F21V 13/06 |
| | | | 362/470 |
| 2016/0096635 A1 * | 4/2016 | Hessling von Heimendahl | |
| | | | B64D 47/02 |
| | | | 362/470 |

FOREIGN PATENT DOCUMENTS

| | | |
|---|---|---|
| JP | 2004306626 A | 11/2004 |
| WO | 2007113768 A2 | 10/2007 |

* cited by examiner

GROUND ILLUMINATION AIRCRAFT LIGHT UNIT

FOREIGN PRIORITY

This application claims priority to European Patent Application No. 17155659.0 filed Feb. 10, 2017, the entire contents of which is incorporated herein by reference.

TECHNICAL FIELD

Aircraft such as airplanes and helicopters comprise numerous exterior lights which are operated on the ground and/or close to ground, for example taxi lights, landing lights and beacon lights.

BACKGROUND

There is some risk that these lights produce glare on wet surfaces, such as wet runways and/or taxiways, even if the lights are aimed downwards, i.e. below a horizontal plane. Glare is considered as a major contributing factor to loss of perception of speed and distance of the exposed individuals. Therefore there is some risk that glare contributes to ground incidents at bad weather. Reflections on wet surfaces further reduce the amount of light that actually hits the surface and the ground markings, which makes it much more difficult to see those markings.

It therefore would be beneficial to reduce these reflections and to increase the amount of light that becomes visible to aircraft pilots and members of the ground staff.

SUMMARY

Exemplary embodiments of the invention include a ground illumination aircraft light unit comprising: a mounting portion, which is configured for mounting the light unit to an aircraft; a transparent cover, which is mounted to the mounting portion and which, in combination with the mounting portion, defines an interior space of the light unit; and at least one light source, which is arranged within the interior space of the light unit and which is configured for emitting light for illuminating an airfield in the vicinity of the aircraft. The light unit is configured to emit predominantly p-polarized light in a predefined spatial sector and to emit non-polarized light in an area outside said predefined spatial sector. In this context "predominantly" is to be understood such that at least 75%, preferably more than 90%, of the light emitted in the predefined spatial sector is p-polarized.

Emitting predominantly p-polarized light in a predefined spatial sector reduces the undesired, disturbing reflection, in particular specular reflection, of light within said spatial sector in wet conditions. The reason for this effect is that p-polarized light passes through water and is reflected diffusely in a desired manner at the structure underneath the water, such as at the runway, and is not reflected in an undesired manner, in particular specularly, by the water. As a result, undesirable glare towards the eyes of pilots and/or ground staff, which is caused by reflected light in wet conditions, is minimized or even completely avoided.

By polarizing only the light which is emitted in the predefined spatial sector and emitting non-polarized light into the area outside said predefined spatial sector, the effect of reducing the intensity of the light, which is caused by polarizing light via blocking the s-polarized portion of the light, is minimized. In consequence, less efforts are necessary for compensating said loss of intensity. As a result, exemplary embodiments of the invention provide power, space and cost efficient ground illumination aircraft light units which provide the necessary/desirable intensity of light but which reduce the effect of glare caused by light reflected on the ground in wet conditions, in particular light, which is specularly reflected.

Exemplary embodiments of the invention further include aircraft, such as airplanes and helicopters, comprising at least one ground illumination aircraft light unit according to an exemplary embodiment of the invention.

According to an embodiment, the predefined spatial sector is centered on an axis, which is oriented parallel to the longitudinal axis of the aircraft. According to a further embodiment, the predefined spatial sector is centered on the longitudinal axis of the aircraft. Since an orientation, which is parallel to or coincides with the longitudinal axis of the aircraft, corresponds with the pilot's main direction of view, such an orientation of the predefined spatial sector, in which only p-polarized light is emitted, results in an efficient reduction of the glare experienced by pilots and experienced by ground personnel observing an approaching aircraft.

According to a further embodiment, the predefined spatial sector has an opening angle in the range of 30° to 40°, in particular an opening angle in the range of 34° to 36°, in a horizontal plane. A predefined spatial sector with an opening angle in this range results in a good compromise between reducing the glare and maintaining a sufficient intensity of light in the periphery of the light cone.

According to a further embodiment, the ground illumination aircraft light unit further comprises an optical system, in particular an optical system including at least one lens and/or at least one reflector, which is configured for focusing the emitted light. The optical system in particular may be configured to focus the light which is emitted in the predefined spatial sector. Focusing the emitted light allows increasing the intensity of the light, in particular in the predefined spatial sector without increasing the intensity of the light source. Focusing the emitted light in particular allows for an efficient use of the light generated by the at least one light source.

According to a further embodiment, the at least one light source comprises at least one LED. The at least one light source in particular may be an LED. LEDs provide cost and energy efficient light sources having a long life time.

According to a further embodiment, the light unit comprises a plurality of light sources. In such a configuration the density and/or the intensity of the light sources emitting light into the predefined spatial sector may be higher than the density and/or the intensity of the light sources emitting light outside said predefined spatial sector. Providing more and/or more intense light sources emitting light that leaves the light unit as polarized light, as compared to light sources emitting light that leaves the light unit as not polarized, allows to compensate for the loss of intensity which is caused by polarizing the light. It further allows to provide a light cone having a nearly homogeneous intensity which comprises at least one area of polarized light and at least one area of non-polarized light.

According to a further embodiment, at least one additional and/or more intense light source, which is provided for compensating for the loss of intensity caused by the polarization, may be configured to emit its light predominantly in the predefined spatial sector. This results in a very efficient compensation of the intensity losses caused by polarizing a portion of the emitted light.

According to a further embodiment, the light unit is configured to emit light having an intensity, in particular a peak intensity, of at least 100 cd. In order to provide enough light for sufficiently illuminating the ground in the vicinity of the aircraft, the light unit in particular may be configured to emit light having an intensity of 400 cd to 1000 cd.

According to a further embodiment, the ground illumination aircraft light unit further comprises at least one polarization filter which is configured to block s-polarized light and to basically allow only p-polarized light to pass.

The filter in particular may be configured such that more than 90%, in particular more than 95% and more particularly more than 98% of the light passing the filter is p-polarized. The at least one polarization filter in particular may be configured to polarize (only) light which is emitted in the predefined spatial sector. A polarization filter provides a convenient, efficient and inexpensive means for providing p-polarized light.

According to a further embodiment, the light unit is configured such that no light is emitted into the upper hemisphere, in particular into an area which is located above a distance from the ground at which the light unit is mounted to the aircraft. Such a configuration avoids that light emitted from the light unit directly hits a pilot's eye, in particular the eye of a pilot of another aircraft.

According to a further embodiment, the light unit is at least one of a beacon light unit, a landing light unit, an awareness light unit, in particular a belly awareness light unit, a runway turn-off light unit, a take-off light unit and a taxi light unit. The light unit also may be a multi-functional light unit providing at least two of the functionalities of a landing light unit, a runway turn-off light unit, a take-off light unit, and a taxi light unit. All these kinds of light units emit light to the ground below and/or in front of the aircraft and therefore may cause glare by light reflected from the ground. This glare may be reduced, minimized or even prevented by configuring said light units according to an exemplary embodiment of the invention.

A beacon light, as understood herein, is a red flashing light, provided for avoiding collisions on an airport and/or during approach/take off and for alerting the ground personnel of running engines. Beacon lights may be provided on the top and the bottom of the aircraft fuselage. It si also possible to move beacon light functionality to other locations, such as wing tips of the tail of the aircraft. In order to still alert ground personnel in such scenarios, red flashing awareness lights may be used. For example, a red flashing awareness light may be provided on the bottom of the aircraft fuselage, with such an awareness light also being referred to as belly awareness light. The belly awareness light may be similar in construction to a belly-mounted beacon light, but may have lower light intensity, as it only illuminates the immediate ground environment of the aircraft. Landing, take-off, taxi, and runway turn-off lights are generally white lights that provide for continuous illumination. These lights are generally directed forward, with the runway turn-off lights being somewhat angled to the sides.

According to a further embodiment, the mounting portion of the light unit is configured for mounting the light unit to the fuselage, to a wing and/or to a gear, in particular to a front gear, of the aircraft. This allows to mount the light unit to the aircraft at a position which best suits the respective functionality of the light unit.

BRIEF DESCRIPTION OF THE DRAWINGS

Exemplary embodiments of the invention are described in detail below with reference to the figures, wherein.

DETAILED DESCRIPTION

Figure 1:
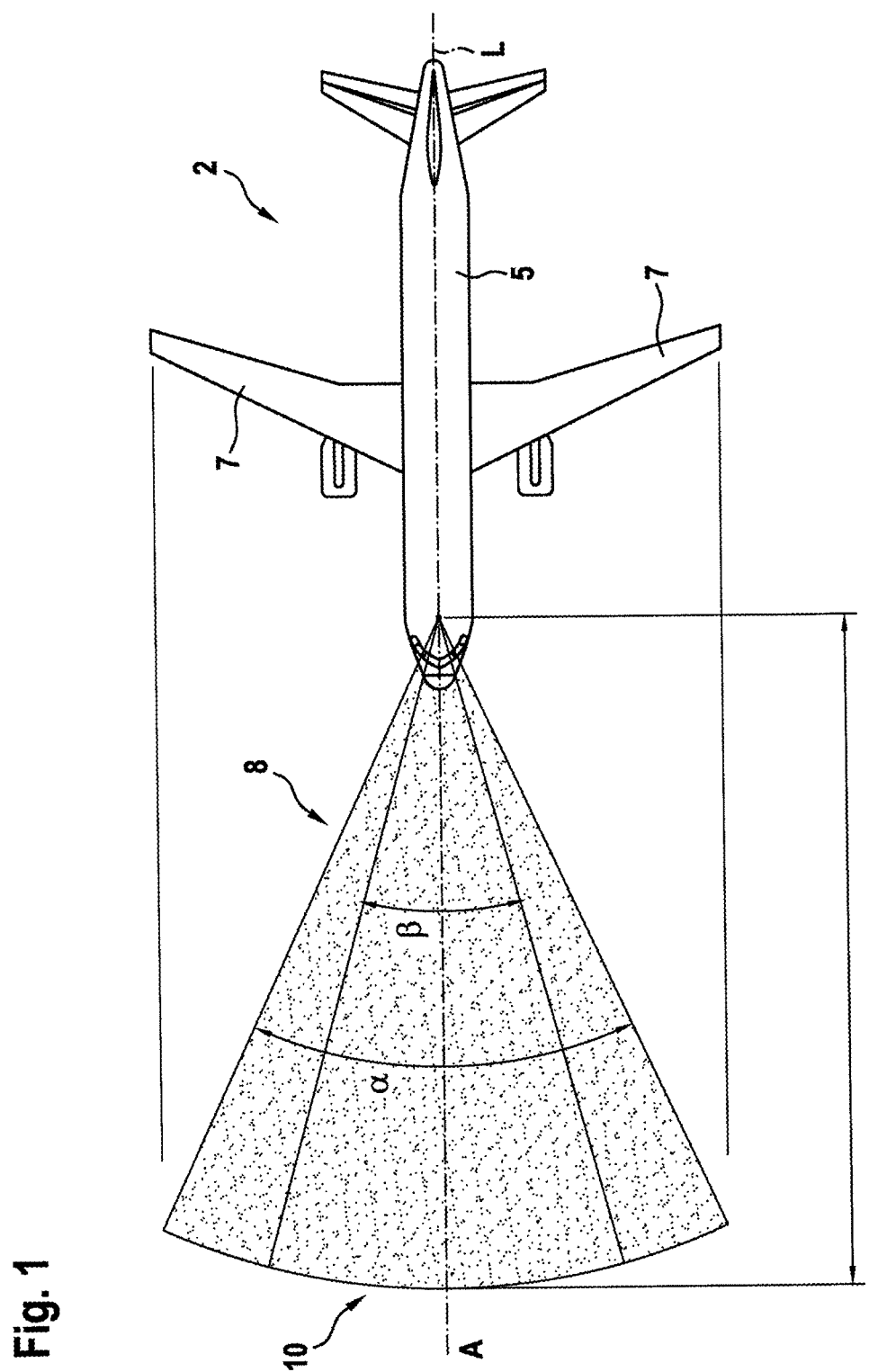
FIG. 1 shows a top view of an air plane comprising a ground illumination aircraft light unit according to an exemplary embodiment of the invention.
Figure 2:
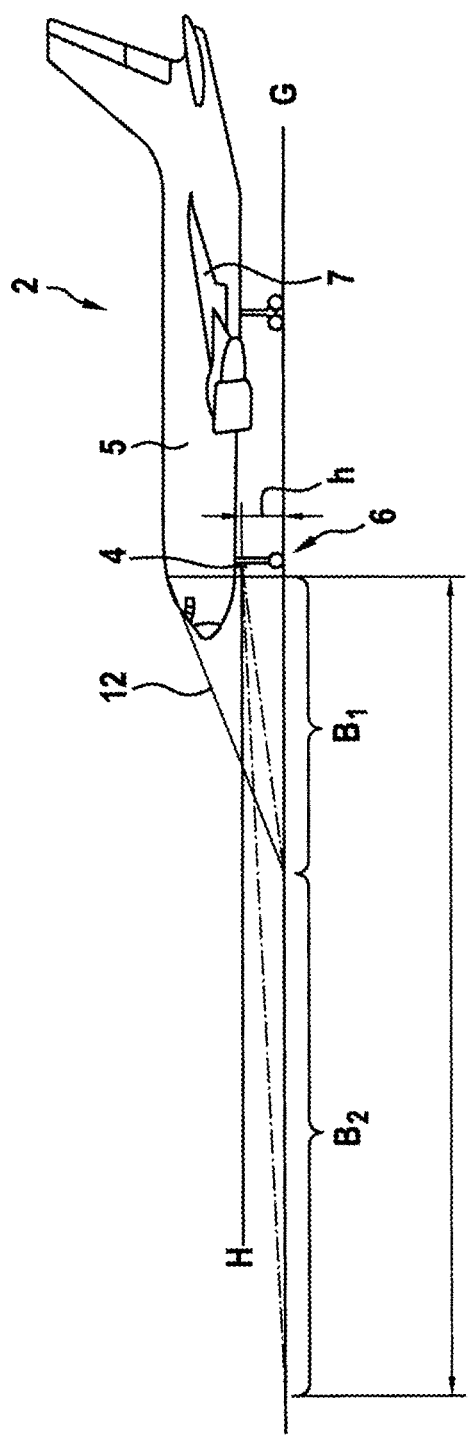
FIG. 2 shows a schematic side view of the air plane shown in FIG. 1.

FIG. 1 shows a schematic top view and FIG. 2 shows a schematic side view of an aircraft 2, in particular an air plane 2, comprising a fuselage 5 and two wings 7. The air plane 2 is equipped with a ground illumination aircraft light unit 4 according to an exemplary embodiment of the invention. In the exemplary embodiment shown in FIGS. 1 and 2, the ground illumination aircraft light unit 4 in particular is configured as a landing light unit 4, which is attached to a front gear 6 of the aircraft 2.

When operated (switched on), the light unit 4 emits a light cone 8 into an area in front of the aircraft 2. In the embodiment shown in FIGS. 1 and 2, the axis A of said light cone 8, when projected on a horizontal plane H, coincides with the longitudinal axis L of the aircraft 2. The skilled person will understand that this is not necessarily the case when the light unit 4 is mounted in some distance from the longitudinal axis L of the aircraft 2 and/or if the light unit 4 is directed in another direction or not directed at all. For example, a runway turn-off light unit may be angled towards the side. In another example, a beacon light unit or an awareness light unit may have a homogeneous or substantially homogeneous 360° light intensity distribution. Generally, the axis A of the light cone 8 emitted by the light unit 4 may be oriented parallel or non-parallel to the longitudinal axis L of the aircraft 2.

In order to avoid direct glare caused by light emitted from the light unit 4, the light cone 8 is oriented downwards (see FIG. 2), so that the light unit 4 emits almost no light into the upper hemisphere. The light unit 4 in particular emits almost no light into an area above a horizontal plane H which is located in some vertical distance from the ground G. "Almost no light" is to be understood such that at maximum light having an intensity of 3% of the peak intensity of the light emitted by the light unit 4 is emitted into the upper hemisphere. The horizontal plane H in particular may be located at the height h of the light unit 4 above the ground G, so that the light unit 4 does not emit any light into an area above its own height h.

There is no risk that light, which is reflected from the ground G in an area B1 close to the aircraft 2, contributes to glare, since this area B1 is below the pilot's line of view 12. In consequence, light, which is reflected from the ground G in said area B1, is not visible to the pilot.

However, light, which is emitted from the light unit 4 and reflected from the ground G, in particular from a wet ground, in an area B2, which is more distant from the aircraft 2 than the area B1, may hit a pilot's eye causing glare.

In order to avoid such undesirable glare, light, which is emitted from the light unit 4 in a predefined spatial sector, is p-polarized, generating an inner p-polarized light cone 10. The water on the wet ground G reflects only s-polarized light, but no p-polarized light. Emitting only p-polarized light therefore prevents this light from being reflected from the water on the ground G in an undesired manner. As a result, there is no glare caused by light which is emitted from the light unit 4 and specularly reflected from the water on the ground G in an undesired manner. The p-polarized light is diffusely reflected by the ground surface below the water on the ground, thus still resulting in a desired illumination of the ground surface.

The light emitted by the light unit 4 is generated by at least one light source 40, such as an LED, which is not shown in FIGS. 1 and 2. At least a portion of the light generated by the at least one light source 40 is polarized by an appropriate polarization device 38, such as a polarization filter, which is also not shown in FIGS. 1 and 2. Polarizing non-polarized light generally reduces the intensity of the light. Thus, in order to emit a predefined intensity of polarized light, the at least one light source 40 needs to generate a higher intensity of non-polarized light in order to compensate for the loss of intensity, which is caused by polarizing the light.

In order to minimize the losses caused by polarizing the light, only light which is emitted in a central portion of the light cone 8 is polarized. As schematically depicted in FIG. 1, the light cone 8 emitted by the light unit 4 has an opening angle α in the horizontal plane H, but only light which is emitted in an inner p-polarized light cone 10 corresponding to a predefined spatial sector, which has an opening angle β<α in the horizontal plane H, is polarized.

Light from the periphery of the light cone 8, i.e. light from the portions of the light cone 8, which do not belong to inner p-polarized light cone 10, usually is not reflected directly to a pilot's eye and therefore does not considerably contribute to glare.

As a result, polarizing the light only in an inner p-polarized light cone 10, i.e. a central portion of the light cone 8, reduces the glare experienced by a pilot without reducing the illumination of the periphery, which does not contribute to glare.

When projected onto the horizontal plane H, the inner p-polarized light cone 10 in particular may have an opening angle β in the range of 30° to 40°, in particular an opening angle β in the range of 34° to 36°, more particularly an opening angle β of 35°. Such an inner light cone 10 with an opening angle β in this range provides a good compromise between reducing glare and providing sufficient illumination intensity, in particular in the periphery of the light cone 8.

In order to compensate for the reduction of the intensity of the polarized light, which is emitted in the inner p-polarized light cone 10, the light unit 4 may comprise additional and/or more intense light sources 40 than a light unit which is configured to emit only non-polarized light. For achieving a good efficiency, said additional and/or more intense light sources 40 in particular may be configured to emit their light only in the inner p-polarized light cone 10.

Ground illumination aircraft light units 4 according to exemplary embodiments of the invention are discussed in more detail in the following with respect to FIGS. 3 to 5.

Figure 3:
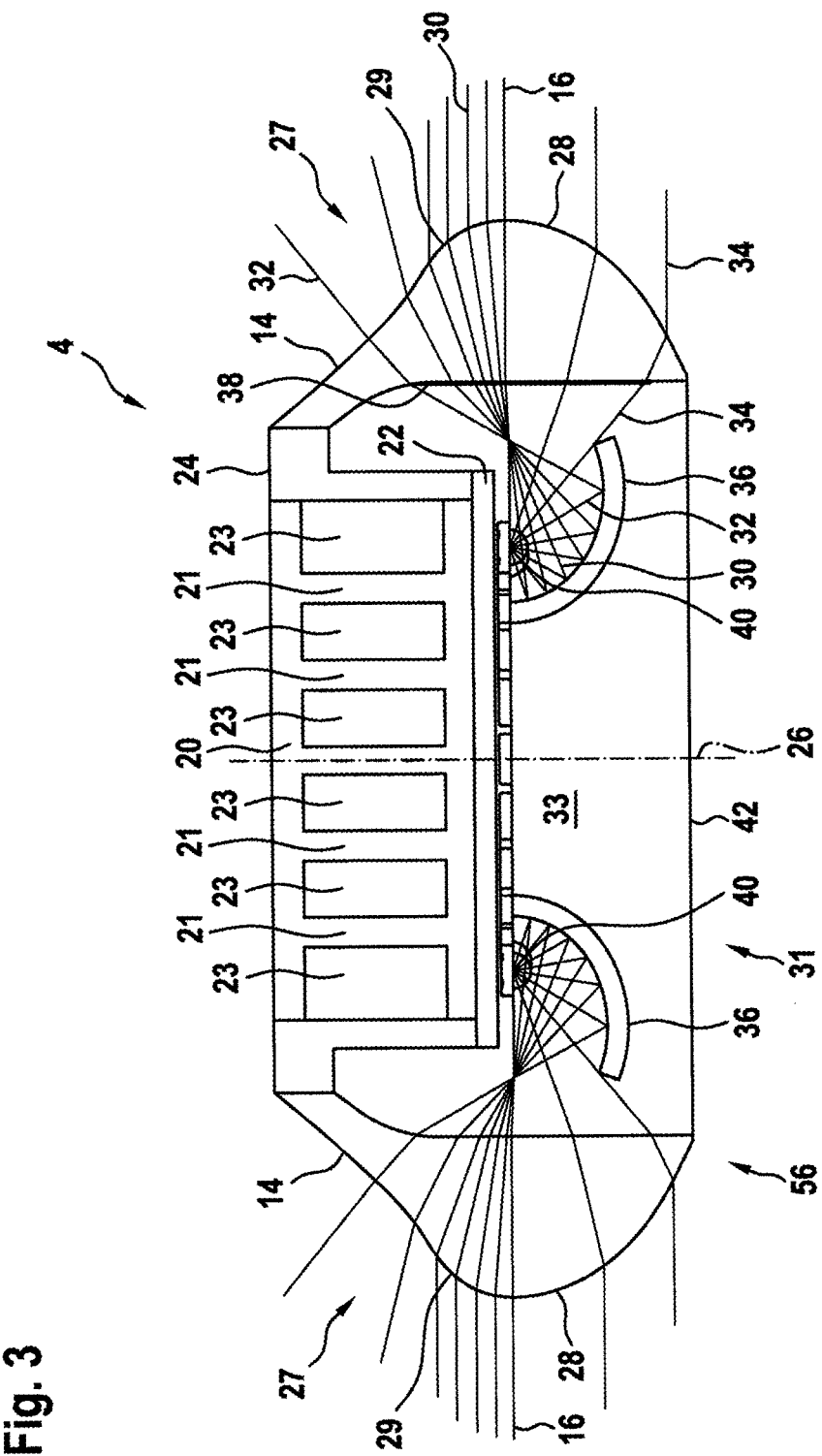
FIG. 3 shows a cross-sectional view of a ground illumination aircraft light unit in accordance with an exemplary embodiment of the invention.
Figure 4:
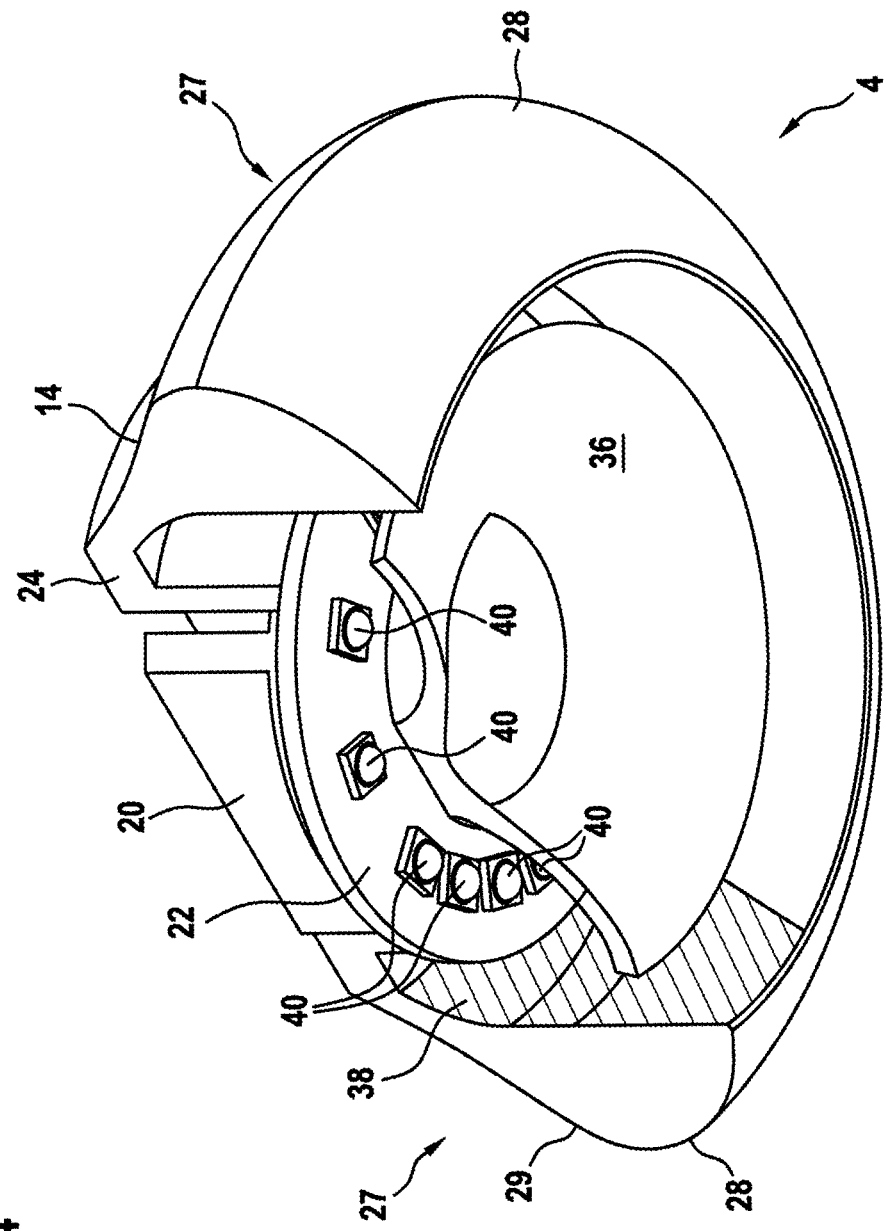
FIG. 4 shows a schematic perspective view of the ground illumination aircraft light unit shown in FIG. 3.

FIG. 3 shows a cross-sectional view and FIG. 4 shows a perspective view of a ground illumination aircraft light unit 4 in accordance with an exemplary embodiment of the invention. The exemplary light unit 4, which is shown in FIGS. 3 and 4, may be mounted to the top (roof) or to the bottom (belly) of the fuselage 5 of an aircraft 2. Accordingly, the light unit 4 may be used e.g. as a beacon light mounted to the top of the fuselage 5. The light unit 4 may equally be used as a beacon light mounted to the bottom of the fuselage 5. For this purpose, the light unit 4 may be merely flipped upside down.

The light unit 4, shown in FIGS. 3 and 4, includes a central support plate 22 supporting further elements of the light unit 4. In the exemplary embodiment shown in FIGS. 3 and 4, the support plate 22 is circular around a central axis of rotation 26. On one side of the support plate 22, which is the bottom side of the support plate 22 in the depicted orientation of the light unit 4, a plurality of light sources 40, in particular LEDs, are provided. Said plurality of light sources 40 are arranged in a configuration which is circular around the central axis 26 of rotation 2. The light sources 40 are arranged adjacent to each other. In the cross-sectional view of FIG. 3, two light sources 40 are shown.

A rotationally symmetric elliptical reflector 36 is mounted to the same side of the support plate 22 as the light sources 40. The elliptical reflector 36 has an annular structure, whose inner side is attached to the support plate 22 towards the inside of the light sources 40 and which extends towards the outside underneath the plurality of light sources 40. The terms inside and outside relate to the axis of rotation 26. The elliptic reflector 36 is rotationally symmetric around the axis of rotation 26. The elliptical reflector 36 is referred to as elliptical, because it has an elliptical shape in the cross-sectional plane of FIG. 3 as well as in all other vertical cross-sectional planes including the axis of rotation 26.

A lens structure is mounted to the support plate 22 on the other side thereof. This lens structure is a single-piece integrated structure that comprises a mounting arm 24, a first lens 27, and a second lens 28. The first lens 27 in turn comprises an aspherical collimating lens portion 29 and a free form lens portion 14. The mounting arm 24 transitions into the free form lens portion 14, which in turn transitions into the aspherical collimating lens portion 29, which in turn transitions into the second lens 28. In the drawing plane of FIG. 3, the mounting arm 24 extends towards the top from the support plate 22, before turning towards the outside, as seen from the axis of rotation 26. The free form lens portion 14, the aspherical collimating lens portion 29, and the second lens 28 then extend from the mounting arm 24 towards the bottom in the drawing plane of FIG. 3. The lens structure, consisting of the mounting arm 24, the first lens 27, and the second lens 28, is also rotationally symmetric with respect to the axis of rotation 26.

A mounting plate constituting a mounting portion 42, which is configured for mounting the light unit 4 to the aircraft 2, covers a central circular opening 31 in the second lens 28. In order to allow for an unobstructed view into the light unit 4, the mounting portion 42 is not shown in FIG. 4.

The mounting arm 24, the first lens 27, the second lens 28 and the mounting plate 42 define an inner space 33 of the light unit 4, which houses the support plate 22 supporting the light sources 40 and the reflectors 36. The mounting arm 24, the first lens 27, the second lens 28, the mounting plate 42, and the support plate form a housing around the light sources 40 and the reflectors 36 and thus protect the light sources 40 and the reflector 36 from negative influences from the environment, such as dirt, water and/or moisture, and also from mechanical damage. The lens structure and the mounting arm 24 may be jointly referred to as a transparent cover, defining the inner space 33 of the light unit 4 and having sufficient transparent portions for emitting the light. It is also possible to refer to the lens structure, the mounting arm 24, the support plate 22, and the heat sink structure 20, which is described below, as the transparent cover. Although not all of those components are transparent, the structure has sufficient transparent portions for emitting the light. It is also possible that an additional transparent cover, which is not shown in FIGS. 3 and 4, is provided and arranged over the components shown in FIGS. 3 and 4 in order to provide additional protection.

The plane separating the first lens 27 from the second lens 28 coincides with the plane through the surface of the support plate 22 to which the plurality of light sources 40 are attached. In other words, the bottom surface of the mounting plane 22, when extended horizontally, represents the boundary between the first lens 27 and the second lens 28. In the cross-sectional view of FIG. 3, the inner surface of the second lens 28 and of the aspherical collimating lens portion 29 of the first lens 27 are a straight vertical line. In three dimensions, the inner surface of the second lens 28 and of the aspherical collimating lens portion 29 of the first lens 27 form a cylindrical surface around the axis of rotation 26. The free form lens 14 has both an inner surface and an outer surface that are not basic geometrical shapes.

The light unit 4 further comprises a heat sink structure 20, which is attached to the same side of the support plate 22 that the lens structure is attached to. The heat sink structure 20 extends in the space between the mounting arm 24, which has the form of a hollow cylinder. The heat sink structure 20 is provided for absorbing the heat generated by the plurality of light sources 40 and for transporting said heat away from the support plate 22. For this purpose, the heat sink structure 20 has cooling ribs 21 that define cooling channels 23 therebetween.

It is pointed out that the light sources 40 are respectively positioned in focal points of the elliptical reflector 36 and of the second lens 28. The elliptical reflector 36 has a second focal point 18 in every cross-sectional plane that is orthogonal to the main light output plane, such as the drawing plane of FIG. 3. This focal point 18 is also the focal point of the aspherical collimating lens portion 29 of the first lens 27.

In the following, the operation of the light unit 4 is described with respect to the right hand side of the light unit 4 shown in FIG. 3, as depicted in the drawing plane of FIG. 3. As the optical elements of the reflector 36, the first lens 27 and the second lens 28 are rotationally symmetric, the optical properties equally apply to the left hand side of the light unit 4 of FIG. 3 as well as to all other cross-sections of the light unit 4 including the axis of rotation 26.

In the following, the operation of the light unit 4 is described with respect to three exemplary light rays 30, 32 and 34. The first light ray 30 is an exemplary light ray of the first portion of the light emitted from the light source 40. It is emitted towards the left bottom in the drawing plane of FIG. 3. Belonging to the first portion of light emitted from the light source 40, it is reflected by the elliptical reflector 36. In particular, the first light ray 30 extends from the light source 40 towards the reflector 36, from where it is reflected towards the aspherical collimating lens portion 29 of the first lens 27. On its path from the reflector 36 to the aspherical collimating lens portion 29, the first light ray 30 travels through the second focal point 18 of the elliptical reflector 36. The first light ray 30 is refracted by the aspherical collimating lens portion 29 in such a way that it leaves the light unit 4 in a horizontal direction. Being in a horizontal direction, the first light ray 30 contributes to the emission in the main light output plane, which corresponds to the depicted horizontal plane 16.

It is emphasized that the slight offset between the first light ray 30 and the depicted horizontal plane 16 is negligible when looking at the light unit 4 from a reasonable distance, i.e. from a distance that is representative of the intended signaling distance of an aircraft beacon light. Accordingly, all light rays leaving the light unit 4 in the horizontal plane 16 or parallel to the horizontal plane 16 equally contribute to the emission in the main light output plane. They have no angle with respect to the main light output plane.

The second light ray 32 also belongs to the first portion of the light emitted from the light source 40. As such, it is reflected by the reflector 36 and directed towards the second focal point 18. However, as the second light ray 32 is emitted from the light source 40 towards the right bottom in the drawing plane of FIG. 3, it is reflected by the elliptical reflector 36 towards the free form lens portion 14 of the first lens 27. In the free form lens portion 14, the second light ray is refracted at both the inner surface and the outer surface thereof. In this way, its traveling direction is altered by the free form lens portion 14 as compared to its traveling path on the inside of the first lens 27.

The third light ray 34 is emitted from the light source 40 towards the second lens 28 where it is refracted into the main light output plane. On its way to the second lens 28, the third light ray 34 crosses the first light ray 30 and the second light ray 32.

The skilled person will understand that the course and characteristics of the light rays 30, 32, 34 shown in FIG. 3 are only exemplary and that exemplary embodiments of the invention may be implemented employing different light distributions as well.

The light unit 4 has an output light intensity distribution that is substantially uniform over 360° in the horizontal plane. In a vertical cross-section, the output light intensity distribution may have a peak in the horizontal plane and may have a gradual decrease towards one side thereof and a sharp drop to zero or almost zero towards the other side thereof. In this way, the light unit 4 is suitable as a beacon light unit or as an awareness light unit, as described above.

At least one polarization filter 38 is arranged in the light path between the reflector 36 and the first and second lenses 27, 28 along at least a portion of the circumference. The at least one polarization filter 38 in particular covers an angle $\beta$ of the circumference in a plane which is perpendicular to the axis of rotation 26. This configuration produces a p-polarized light cone 10 with an opening angle $\beta$ in the horizontal plane H, as mentioned and discussed before in particular with respect to FIG. 1. The light unit 4 may emit non-polarized light in the remainder of the 360° light intensity distribution outside of the p-polarized light cone 10.

The polarization filter 38 may by attached to the inside of the lenses 27, 28, as shown in FIGS. 3 and 4. Alternatively, the polarization filter 38 may be arranged in the space between the reflector 36 and the first and second lenses 27, 28 or in between the light source(s) 40 and the reflector 36. As another alternative, the lenses 27, 28, the reflector 36 and/or the cover of the light source(s) 40 may be formed from a polarizing material so that the polarization filter 38 is formed integrally with the lenses 27, 28, the reflector 36 and/or with the light source(s) 40.

In order to compensate for the loss of intensity, which is caused by polarizing the light, the density of the light source(s) 40 may be higher in those portions of the circumference, in which the light is polarized, i.e. in the portions of the circumference in which the polarization filter 38 is provided, than in the portions of the circumference in which the light is not polarized.

As exemplarily shown in FIG. 4, the density of light sources 40 may be twice as high in the areas in which the polarization filter 38 is provided than in the areas in which the light emitted from the light sources 40 in not polarized. The higher density of the light sources 40 compensates for the loss of intensity caused by the polarization. As additional light sources 40 are provided only in those areas, in which the light is polarized, the costs for providing the additional light sources 40 are limited and an excessive increase of the costs, weight, and power consumption of the light unit 4 is avoided.

Figure 5:
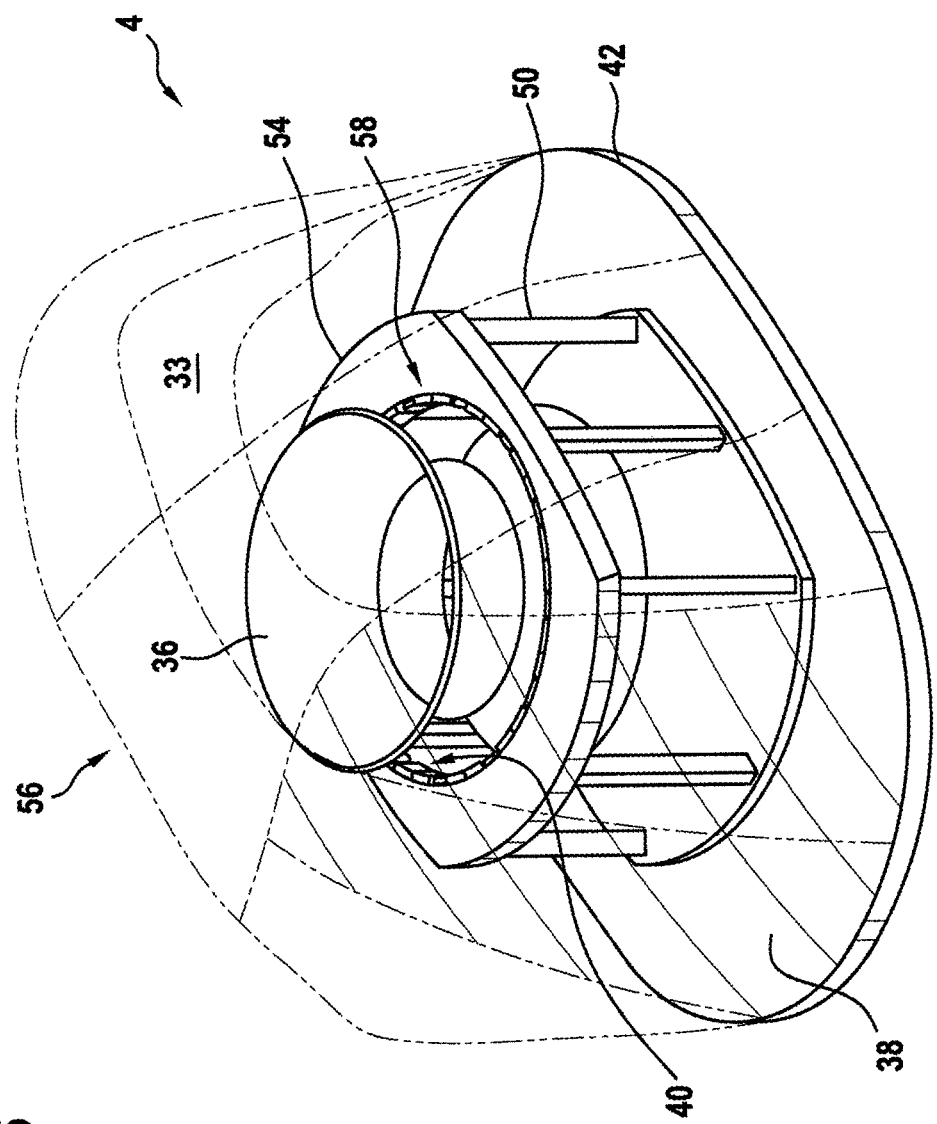
FIG. 5 shows a schematic perspective view of a ground illumination aircraft light unit according to another exemplary embodiment of the invention.

FIG. 5 shows a perspective view of a ground illumination aircraft light unit 4 according to another exemplary embodiment of the invention.

The light unit 4 shown in FIG. 5 comprises a mounting plate constituting a mounting portion 42. The mounting plate may be configured for being mounted to an aircraft 2, in particular to the fuselage 5 of an aircraft 2, via threaded connection elements, such as screws, or via rivets or via any other suitable coupling elements, which are not shown in FIG. 5.

The light unit 4 further comprises a support plate 54. The support plate 54 has a central, in particular circular opening extending through the support plate 54. A plurality of light sources 40, such as LEDs, are mounted to the inner circumference of the opening 50. The support plate 54 is supported on the mounting plate 42 via a plurality of legs 52, which are also referred to as stilts 52. In the exemplary embodiment of FIG. 5, the support plate 54 is supported on the mounting plate 42 via eight stilts 52. The support plate 54 is a generally flat structure, extending generally parallel to the mounting plate 42. Accordingly, the support plate 54 is oriented generally horizontally, when the light unit 4 is mounted to the aircraft 2. The mounting plate 42 and the support plate 54 have similar, generally oval outlines. However, the mounting plate 42 is larger than the support plate 54.

The support plate 54 has a much greater extension in both dimensions of the horizontal plane, as compared to its vertical extension. The horizontal plane is therefore considered the main plane of extension of the support plate 54.

A rotationally symmetric reflector 36 is arranged within the circular opening 50 of the support plate 54. The rotationally symmetric reflector 36 is also supported on the mounting plate 42 via appropriate support elements, which are not shown in FIG. 5.

The light unit 4 further comprises an outer transparent cover 56, which in combination with the support plane 42 constitutes a housing of the light unit 4 defining an interior space 33. The housing isolates the functional elements of the light unit 4, in particular the light sources 40 and the reflector 36, which are located within the interior space 33, from the environment preventing these components 36, 40 from getting wet, being spoiled or even damaged by mechanical impact.

The outer cover 56 is at least partially transparent allowing light, which is generated by the light sources 40 and reflected by the reflector 36, to pass through.

At least a portion of the outer cover 56 may constitute a polarization filter 38, which is configured to allow only p-polarized light to pass through. As a result, the light unit 4 emits only p-polarized light through the portion of the outer cover 56 which is formed as a polarization filter 38. This generates a p-polarized light cone 10 having an opening angle of β, as it has been discussed with respect to FIG. 1. The p-polarized light cone 10 may again be centered around the forward direction of the aircraft.

Alternatively, a polarization filter 38 (not shown), may be provided within the light path between the light sources 40 and the reflector 36 and/or between the reflector 36 and the outer cover 56. The polarization filter 38 in particular may be attached to an inner surface of the outer cover 56.

As shown and discussed for the embodiment illustrated in FIGS. 3 and 4, the density of the light sources 40 may vary along the circumference of the opening 50. The density of the light sources 40 in particular may vary such that in areas emitting light which is polarized the density of light sources 40 is higher than in the areas emitting light which is not polarized. The higher density of the light sources compensates for the loss of intensity, which is caused by polarizing the light, and results in an almost continuous intensity of light over the whole 360° light intensity distribution emitted by the light unit 4.

Alternatively or additionally to increasing the density of the light sources 40, light sources 40 emitting a higher intensity of light may be used for generating the light which is going to be polarized.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A ground illumination aircraft light unit comprising:
a mounting portion, which is configured for mounting the light unit to an aircraft;
a transparent cover, which is mounted to the mounting portion and which, in combination with the mounting portion, defines an interior space of the light unit; and
at least one light source, which is arranged within the interior space of the light unit and which is configured for emitting light for illuminating the ground (G) of an airfield in the vicinity of the aircraft;
wherein the light unit is configured for emitting a light cone having an opening angle (α) when projected on a horizontal plane (H):
the light cone having an inner light cone comprising at least 75% p-polarized light, with the inner light cone forming a predefined spatial sector when projected on the horizontal plane (H); and
the light cone comprising non-polarized light at a periphery thereof in an area outside said predefined spatial sector on both sides of said predefined spatial sector when projected on the horizontal plane (H);
wherein the predefined spatial sector is centered on an axis (A), which is oriented parallel to a longitudinal axis (L) of the aircraft or which is oriented along the longitudinal axis (L) of the aircraft; and
wherein the predefined spatial sector, when projected on the horizontal plane (H), has an opening angle (β), which is smaller than the opening angle (α) of the light cone and which is in the range of 30° to 40°.

2. The ground illumination aircraft light unit according to claim 1, wherein the predefined spatial sector, when projected on a horizontal plane (H), has an opening angle (β) in the range of 34° to 36°.

3. The ground illumination aircraft light unit according to claim 1, further comprising an optical system, which includes at least one lens and/or at least one reflector and which is configured for focusing the light which is emitted into the predefined spatial sector.

4. The ground illumination aircraft light unit according to claim 1, wherein the at least one light source comprises or is at least one light-emitting diode (LED).

5. The ground illumination aircraft light unit according to claim 1, wherein the light unit comprises a plurality of light sources and wherein the density and/or intensity of the light sources emitting light into the predefined spatial sector is higher than the density and/or intensity of the light sources emitting light outside said predefined spatial sector.

6. The ground illumination aircraft light unit according to claim 1, wherein the light unit is configured to emit light having a peak intensity of at least 100 cd.

7. The ground illumination aircraft light unit according to claim 1, further comprising at least one polarization filter which is configured for blocking s-polarized light.

8. The ground illumination aircraft light unit according to claim 7, wherein the polarization filter has an efficiency of more than 90%.

9. The ground illumination aircraft light unit according to claim 7, wherein the polarization filter has an efficiency of more than 95%.

10. The ground illumination aircraft light unit according to claim 7, wherein the polarization filter has an efficiency of between 98% and 100%.

11. The ground illumination aircraft light unit according to claim 1, wherein the light unit is configured such that no light is emitted into an upper hemisphere.

12. The ground illumination aircraft light unit according to claim 1, wherein the light unit is one of: a beacon light unit; a landing light unit; an awareness light unit; a runway turn-off light unit, a take-off light unit; a taxi light unit; and a multi-functional light unit, with the multi-functional light unit providing at least two of the functionalities of a landing light unit, a runway turn-off light unit, a take-off light unit, and a taxi light unit.

13. The ground illumination aircraft light unit according to claim 1, wherein the mounting portion is configured for mounting the light unit to a fuselage or to a wing of an aircraft.

14. The ground illumination aircraft light unit according to claim 1, wherein the mounting portion is configured for mounting the light unit to a front gear of an aircraft.

15. An aircraft, comprising at least one ground illumination aircraft light unit according to claim 1, mounted to a fuselage or to a wing of the aircraft.

16. An aircraft, comprising at least one ground illumination aircraft light unit according to claim 1, mounted to a front gear of the aircraft.

17. The ground illumination aircraft light unit according to claim 1, wherein the light unit is configured to emit light having a peak intensity of between 400 cd and 1000 cd.

18. The ground illumination aircraft light unit according to claim 1, wherein the light unit is configured such that no light is emitted into an area above a height (h) of the light unit.

* * * * *